United States Patent [19]

Payne

[11] Patent Number: 5,522,345
[45] Date of Patent: Jun. 4, 1996

[54] LIVESTOCK FEEDER

[76] Inventor: Joe L. Payne, Rte. 1, Kaw, Okla. 74641

[21] Appl. No.: 170,489

[22] Filed: Dec. 20, 1993

[51] Int. Cl.[6] ........................................... A01K 5/00
[52] U.S. Cl. ...................................... 119/60; 119/58
[58] Field of Search ........................ 119/58, 60, 64, 119/51.01, 61

[56] References Cited

U.S. PATENT DOCUMENTS

| | | | |
|---|---|---|---|
| 3,851,624 | 12/1974 | Peak | 119/60 |
| 3,906,903 | 9/1975 | Vandewater | 119/60 |
| 4,488,510 | 12/1984 | Lundgren | 119/60 |
| 5,337,699 | 8/1994 | Dyson | 119/60 |

FOREIGN PATENT DOCUMENTS

| | | | |
|---|---|---|---|
| 1013221 | 7/1977 | Canada | 119/60 |
| 823803 | 11/1959 | United Kingdom | 119/58 |

OTHER PUBLICATIONS

"Hoofbeats", Feb. 1968, p. 50.

*Primary Examiner*—John G. Weiss
*Attorney, Agent, or Firm*—Dunlap & Codding

[57] ABSTRACT

A livestock feeder for retaining hay so that livestock can consume the hay without trampling thereon is disclosed which includes a plurality of spatially disposed leg member and a plurality of substantially horizontally, spatially disposed retainer members connectable to the leg members. The retainer members are fabricated of a polymeric material having angular deflection characteristics and memory so that the retainer members can be angularly deflected by pressures exerted thereon and restored to a substantially non-deflected position when such pressures are removed.

27 Claims, 7 Drawing Sheets

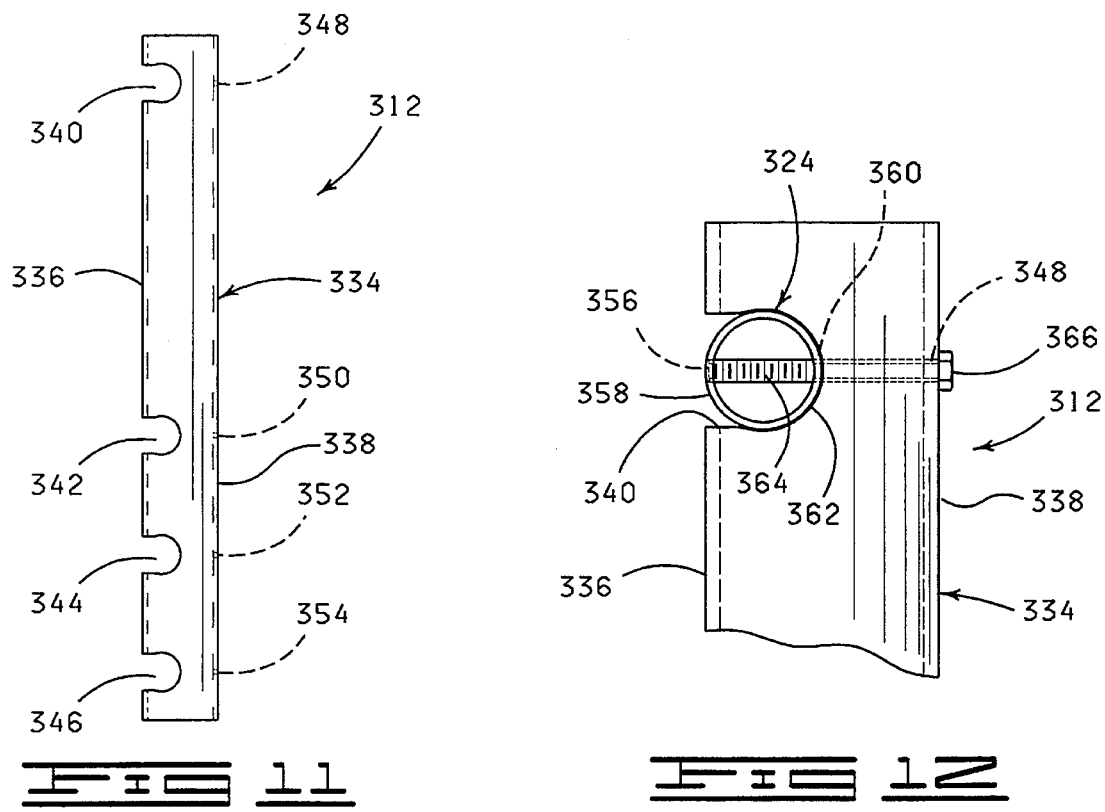
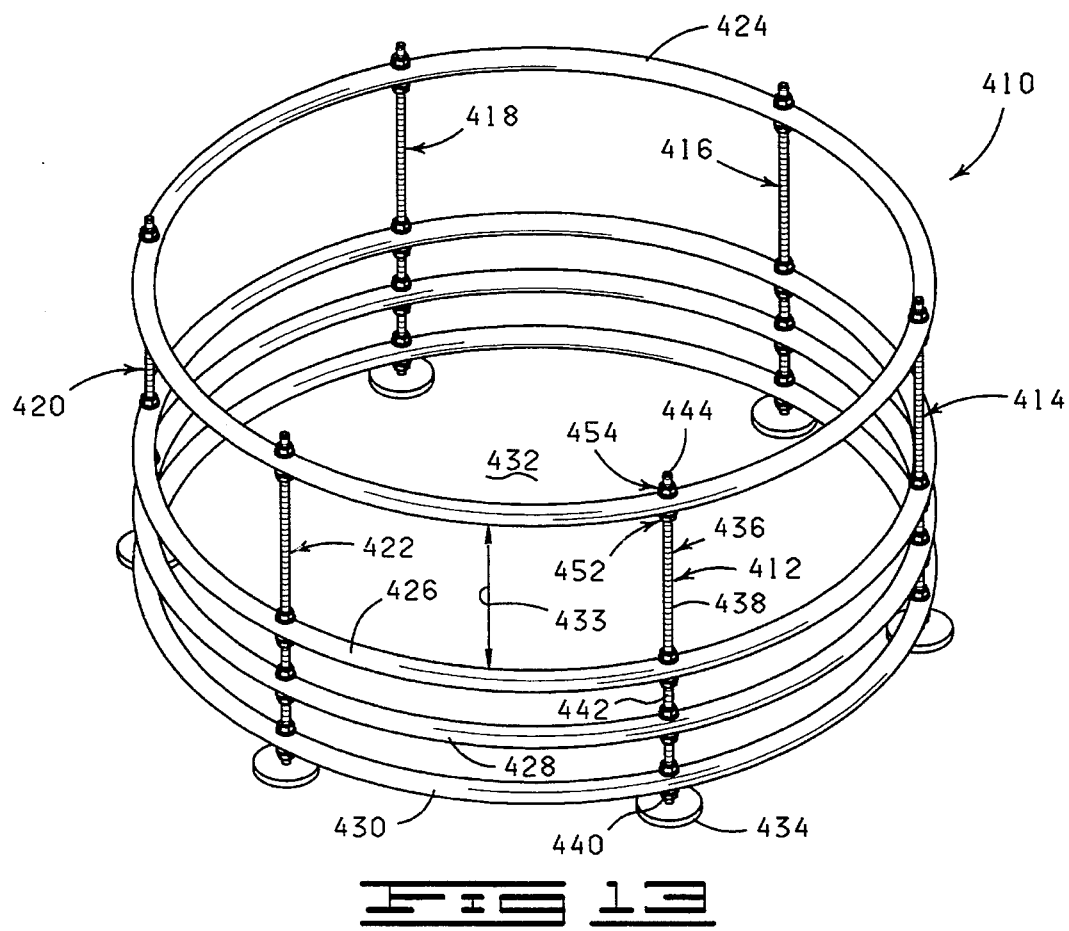

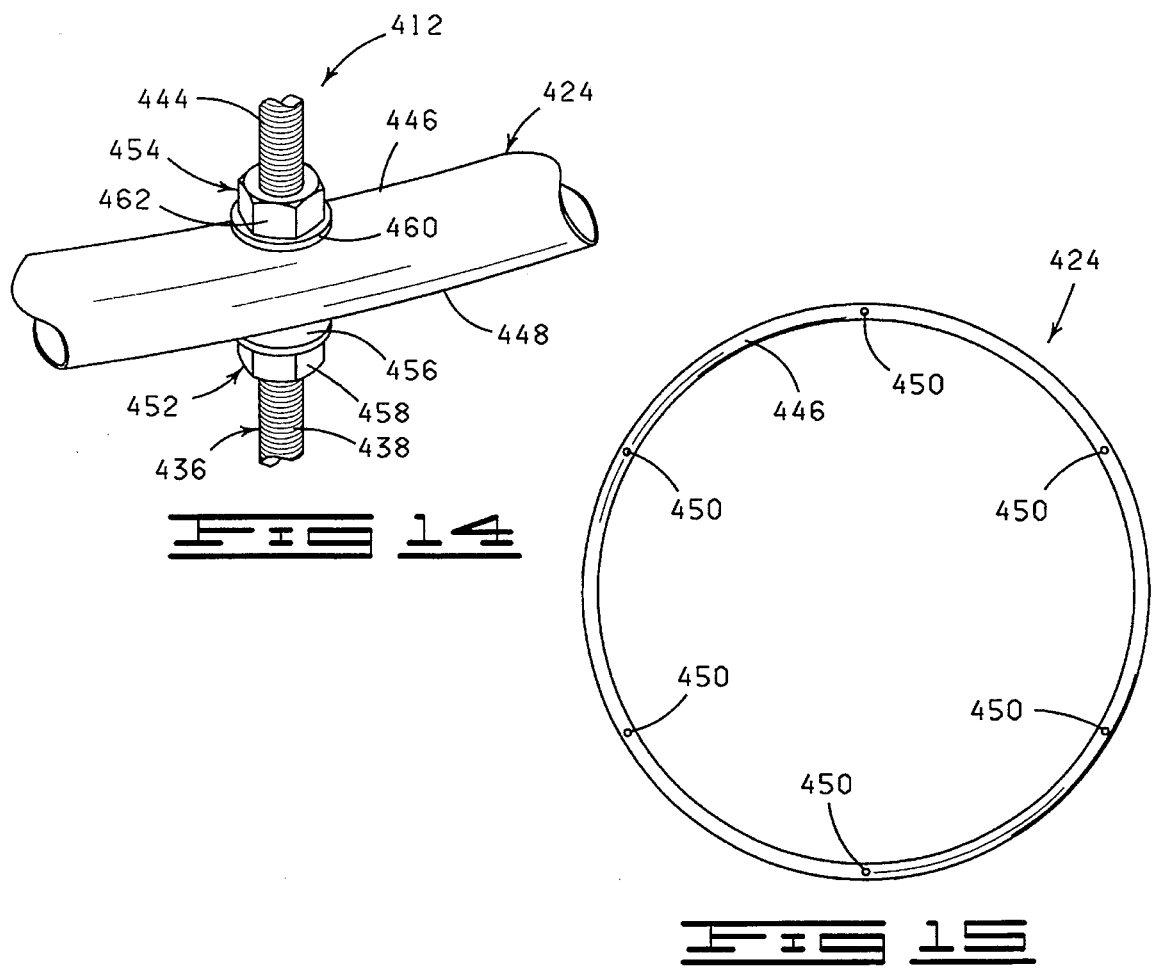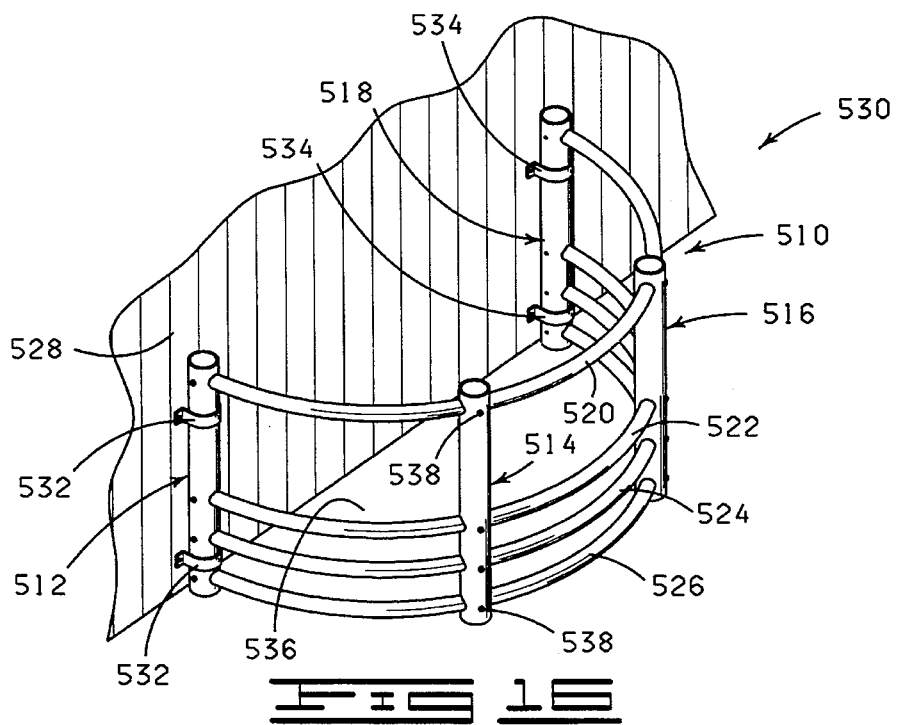

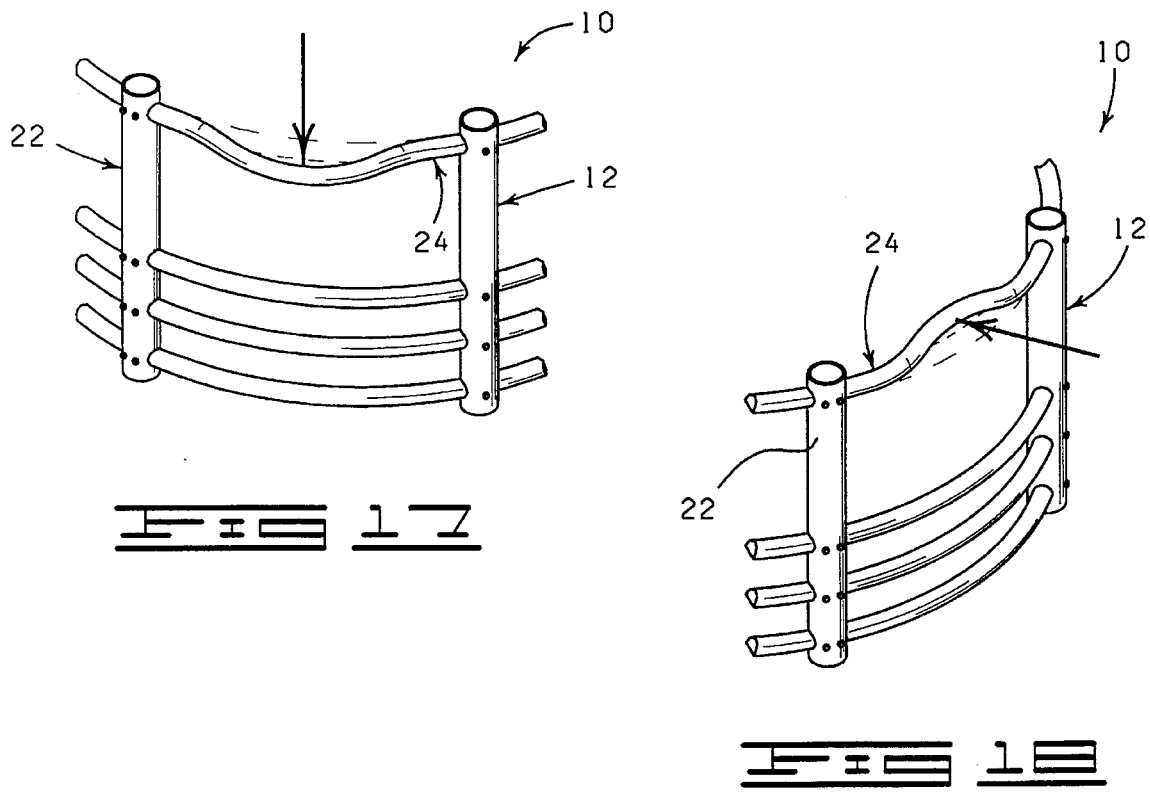
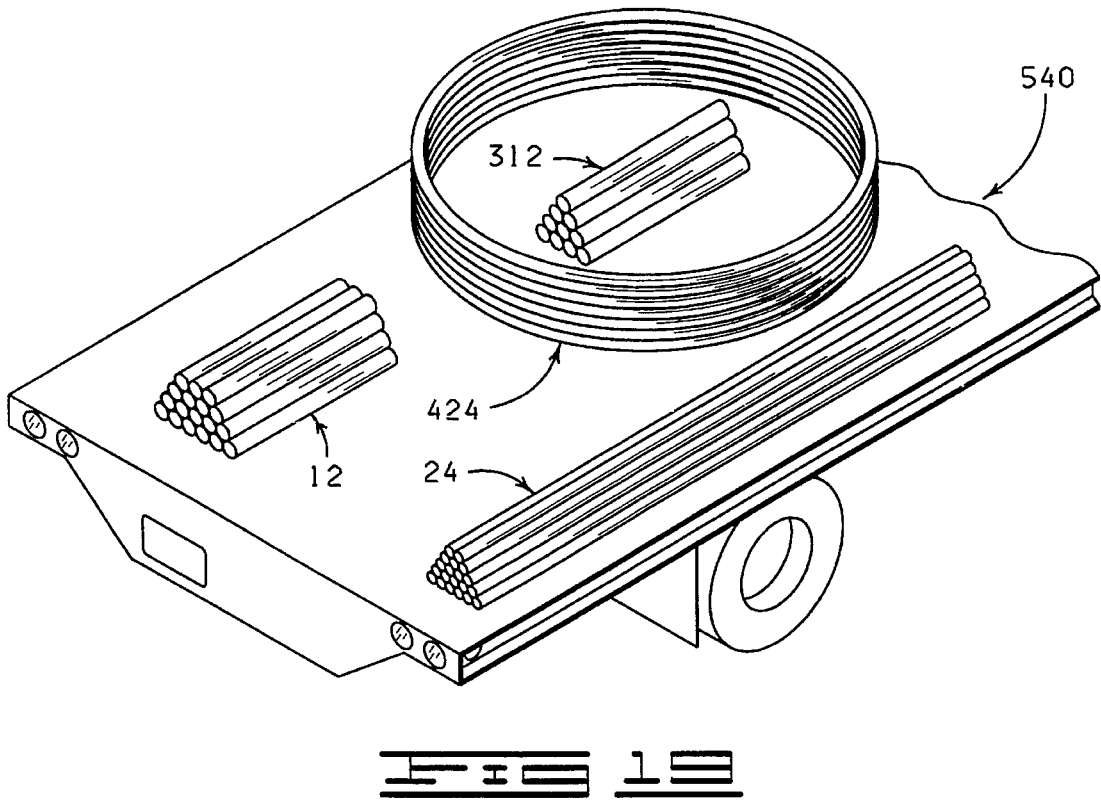

5,522,345

LIVESTOCK FEEDER

FIELD OF THE INVENTION

The present invention relates to a livestock feeder, and more particularly but not by way of limitation, to a livestock feeder for retaining hay so that livestock can consume the hay while being restrained from trampling on the hay.

BRIEF DESCRIPTION OF THE DRAWINGS

FIG. 11 is a side elevational view of a leg member of the livestock feeder of FIG. 10.

FIG. 12 is a fragmental, side elevational view of an upper portion of the leg member of the livestock feeder of FIG. 10 having a retainer member connected thereto.

FIG. 13 is another embodiment of a livestock feeder constructed in accordance with the present invention.

FIG. 14 is a fragmental perspective view illustrating the connection of a leg member and a retaining member of the livestock feeder of FIG. 13.

FIG. 15 is a top plan view of one of the retainer members of the livestock feeder of FIG. 13.

FIG. 16 is another embodiment of the livestock feeder of the present invention disposed adjacent a supporting structure.

FIG. 17 is a fragmental perspective view of the livestock feeder of FIG. 1 illustrating angular displacement of an uppermost disposed retainer member in a downwardly direction.

FIG. 18 is a fragmental perspective view of a portion of the livestock feeder of FIG. 1 illustrating angular displacement of an uppermost disposed retainer member in a horizontal direction.

FIG. 19 is a fragmental perspective view of a trailer depicting various elements of the livestock feeder of the present invention in a non-assembled position.

DESCRIPTION OF PREFERRED EMBODIMENTS

Figure 1:
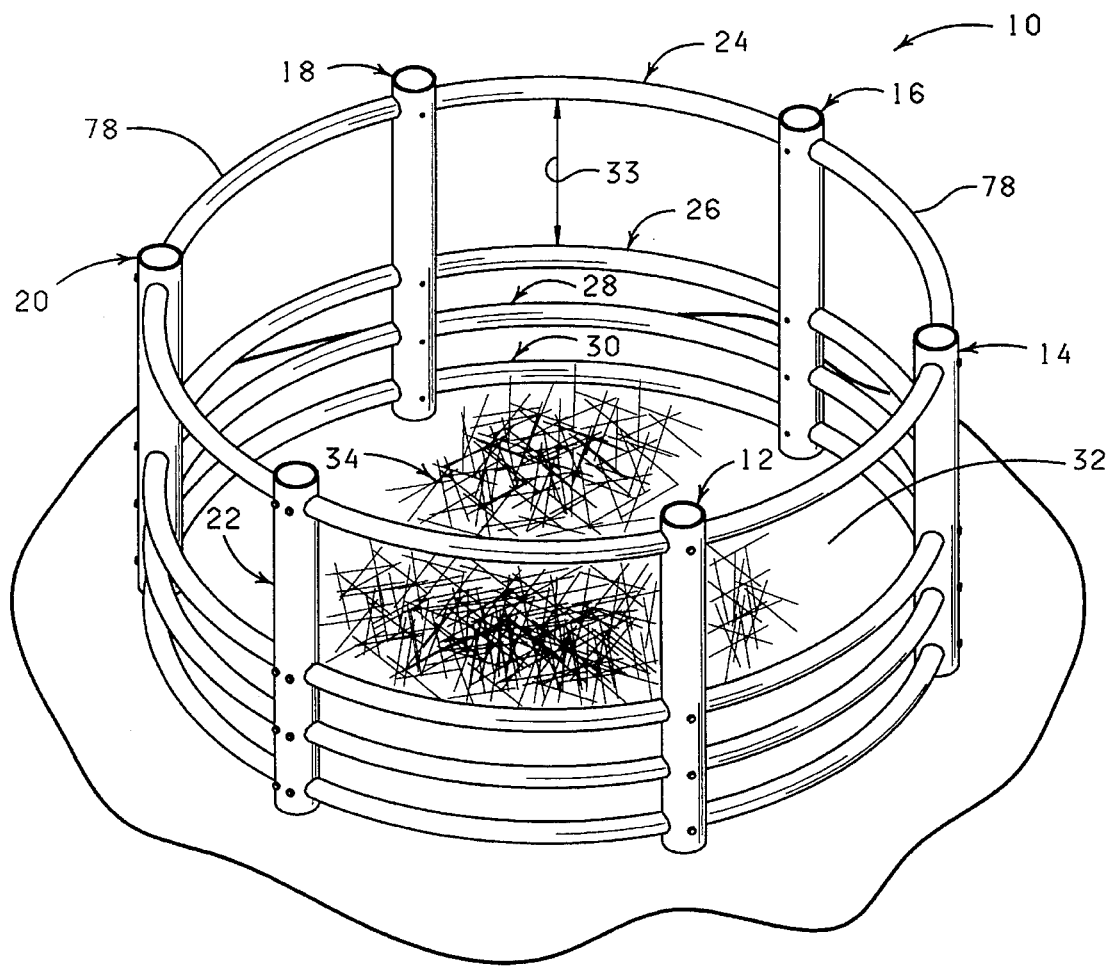
FIG. 1 is a perspective view of a livestock feeder constructed in accordance with the present invention.

Shown in FIG. 1 is a perspective view of a livestock feeder 10 constructed in accordance with the present invention. The livestock feeder 10 includes a plurality of spatially disposed leg members 12, 14, 16, 18, 20 and 22 and a plurality of substantially horizontal, spatially disposed retainer members 24, 26, 28 and 30 which are connected to such leg members so as to define a hay retaining space 32.

The retainer members 24, 26, 28 and 30 are fabricated of a polymeric material having angular deflection characteristics and sufficient memory properties so as to permit the retainer members 24, 26, 28 and 30 to be angularly deflected when pressures are exerted thereon by livestock and thereafter restored to a substantially non-deflected position when such pressures are removed. The retainer members 24 and 26 are disposed a selected distance 33 from each other; and each of the retainer members 24, 26, 28 and 30 is connected to the leg members 12, 14, 16, 18, 20 and 22 so as to define the hay retaining space 32. The distance 33 between the retainer members 24 and 26 permits access to hay 34 in the hay retaining space 32 by livestock, while the retainer members 26, 28 and 30 serve to retain the hay in the hay retaining space 32 and the retainer members 24, 26, 28 and 30 cooperate with the leg members 12, 14, 16, 18, 20 and 22 to prevent the livestock from entering into the hay retaining space 32 and trampling the hay 34.

The use of polymeric material to construct the livestock feeder 10 substantially eliminates problems associated with the rings becoming permanently deformed when engaged by an animal or otherwise, eliminates sharp edges, it won't rust, it won't break or split if water gets in the tubes and freezes, it eliminates the need for continual painting and it eliminates the need for metal welding.

Each of the retainer members 24, 26, 28 and 30 are substantially identical in construction; and, with the exception herein after noted relating to the leg member 22, the leg members 12, 14, 16, 20 and 22 are substantially identical in construction. Thus, only the leg members 12 and 22, the retainer member 24 and the connection of the retainer member 24 to the leg members 12 and 22 will be described in detail hereinafter with reference to FIGS. 2-5.

Figure 2:
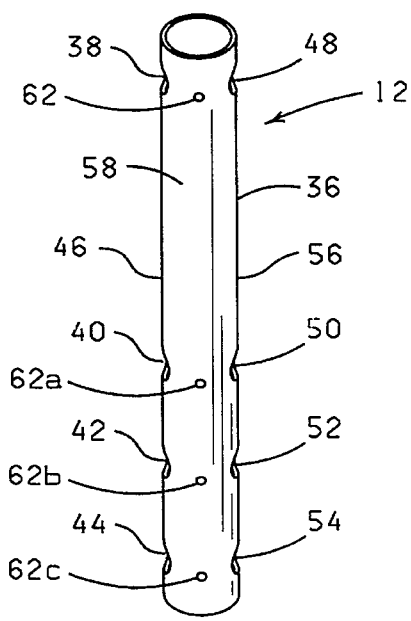
FIG. 2 is a perspective view of a leg member of the livestock feeder of FIG. 1.
Figure 3:
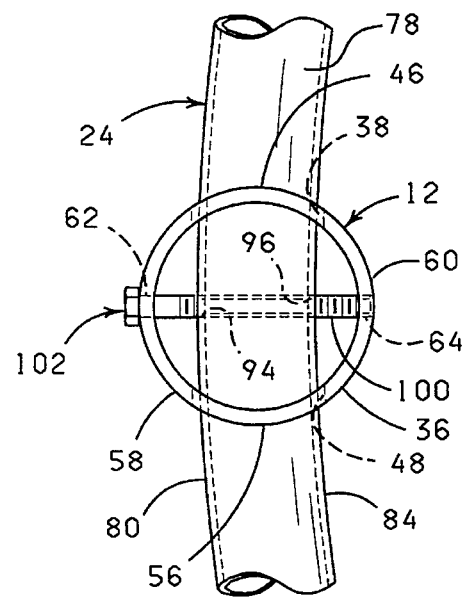
FIG. 3 is a plan view of a leg member of the livestock feeder of FIG. 1 having a retainer member connected thereto.
Figure 4:
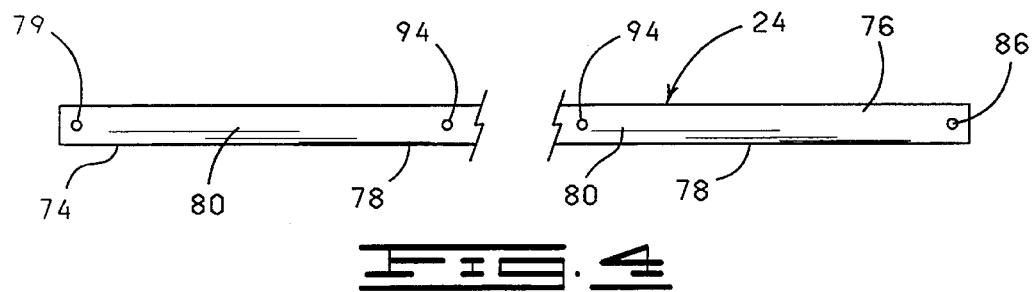
FIG. 4 is a fragmental elevational view of the retainer member of FIG. 3 in a non-assembled position.

As more clearly shown in FIG. 2, the leg member 12 is a tubular member 36 having a plurality of spatially disposed apertures 38, 40, 42 and 44 formed through a sidewall 46 thereof; and a plurality of spatially disposed apertures 48, 50, 52 and 54 formed through an opposed sidewall 56 thereof. The apertures 38, 40, 42 and 44 are axially aligned with the apertures 48, 50, 52 and 54, respectively. The apertures 38, 40, 42 and 44, and the apertures 48, 50, 52 and 54 are sized so as to permit the retainer members, such as the retainer member 24, to be disposed through axially aligned apertures formed through the opposing sidewalls 46, 56 of the tubular member 36, such as the axially aligned apertures 38, 48 (FIG. 3).

As will be described in more detail herein after, in order to stabilize the leg members 12, 14, 16, 18 and 20 relative to the retainer members 24, 26, 28 and 30 so that the leg members 12, 14, 16, 18 and 20 are maintained in a substantially upright, vertically disposed position, a plurality of axially aligned pilot apertures are formed through opposing sidewalls 58 and 60 of each of the leg members, such as pilot apertures 62, 62a, 62b and 62c formed through sidewall 58 of the tubular member 36 of leg member 12 (FIG. 2) and pilot aperture 64 formed through sidewall 60 of the tubular member 36 of leg member 12 (FIG. 3), so that the axis of the pilot apertures is substantially normally disposed to the axis of the aligned apertures formed through the opposing sidewalls 46, 56 of the tubular member 36, such as apertures 38, 48.

Figure 5:
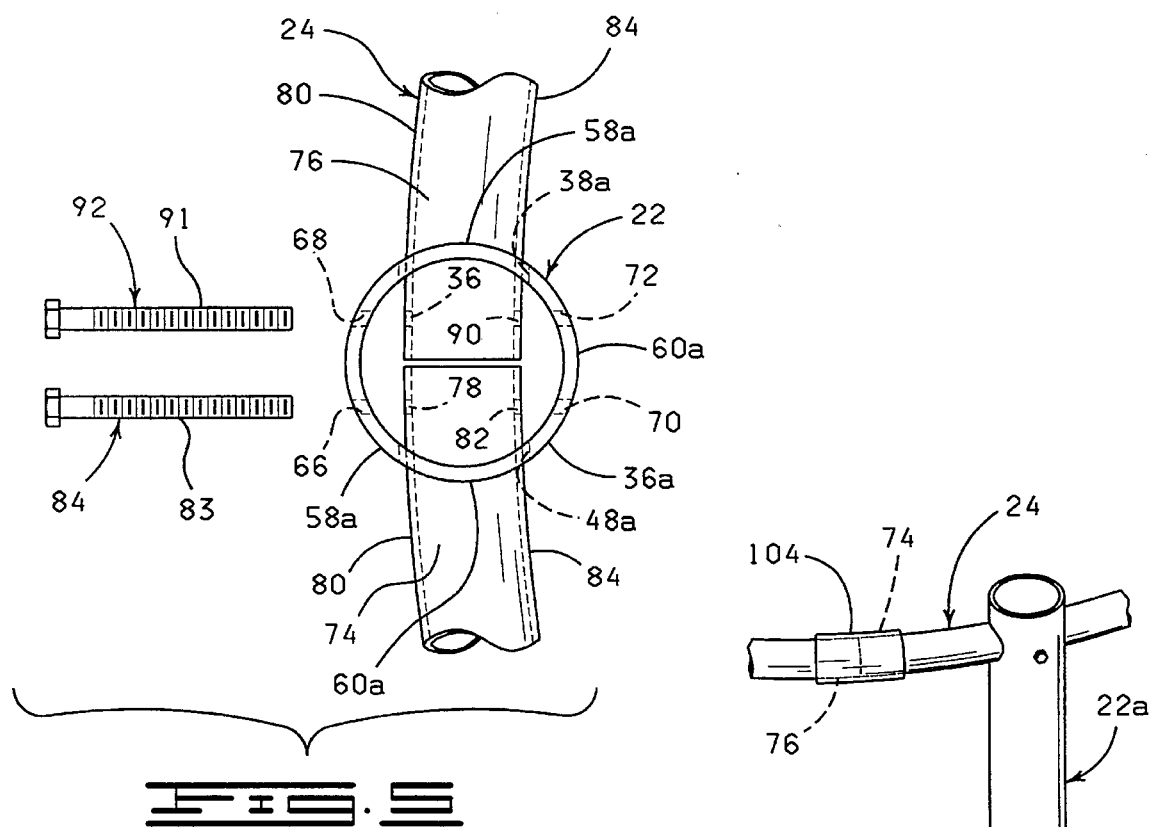
FIG. 5 is a plan view of one of the leg members of the livestock feeder of FIG. 1 having the end portions of one of the retainer members disposed therein for connection to such leg member.

The leg member 22 is a tubular member 36a which is substantially identical in construction to the leg members 12, 14, 16, 18 and 20 except that the leg member 22 is provided with a plurality of axially aligned first pilot apertures and a plurality of axially aligned second pilot apertures formed through opposing sidewalls of the tubular member 36, such as pilot apertures 66, 68 formed through sidewall 58a and pilot apertures 70, 72 formed through sidewall 60a of the tubular member 36a of the leg member 22 (FIG. 5). The axis of the pilot apertures 66, 70 and the axis of the pilot apertures 68, 72 are substantially normally disposed to the axis of the aligned apertures 38a, 48a formed through the opposing sidewalls 58a, 60a of the tubular member 36a.

The retainer member 24 is characterized as having a first end portion 74, a second end portion 76 (FIGS. 4 and 5) and a medial portion 78 (FIGS. 1,3, 4 and 5) extending therebetween. The medial portion 78 of the retainer member 24 extends through the aligned apertures formed through the opposed sidewalls of the leg members 12, 14, 16, 18 and 20, such as the aligned apertures 38 and 48 formed through the opposed sidewalls 46 and 56, respectively, of the leg member 12 (FIG. 3); and the first end portion 74 of the retainer member 24 extends through the aperture 48a of the leg member 22 and the second end portion 76 of the retainer member 24 extends through the aperture 38a of the leg member 22 (FIG. 5). Thus, the first and second end portions 74, 76 of the retainer member 24 are disposed within the leg member 22 in a substantially adjacent, facing position substantially as shown.

To secure the first end portion 74 of the retainer member 24 to the leg member 22, the first end portion 74 of the retainer member 24 is provided with a pilot aperture 79 formed through a sidewall 80 which is axially aligned with a pilot aperture 82 formed through an opposed sidewall 84. The first end portion 74 of the retainer member 24 is positioned within the leg member 22 so that the axially aligned pilot apertures 79, 82 in the first end portion 74 of the retainer member 24 are aligned with the pilot apertures 68, 72 provided in the leg member 22. The pilot apertures 79, 82 in the first end portion 74 of the retainer member 24 and the pilot apertures 66, 70 in the leg member 22 are sized such that upon positioning a connecter member therethrough, such as a threaded shank portion 83 of a bolt 84, the threaded shank portion 83 threadably engages the leg member 22 and the first end portion 74 of the retainer member 24 so that the retainer member 24 is securely connected to the leg member 22.

To secure the second end portion 76 of the retainer member 24 to the leg member 22, the second end portion 76 of the retainer member 24 is provided with a pilot aperture 86 formed through the sidewall 80 which is axially aligned with a pilot aperture 90 formed through the opposed sidewall 84. The second end portion 76 of the retainer member 24 is positioned within the leg member 22 so that the axially aligned pilot apertures 86, 90 in the second end portion 76 of the retainer member 24 are aligned with the pilot apertures 68, 72 provided in the leg member 22. The pilot apertures 86, 90 in the second end portion 76 of the retainer member 24 and the pilot apertures 68, 72 in the leg member 22 are sized such that upon positioning a connecter member there-through, such as a threaded shank portion 91 of a bolt 92, the threaded shank portion 91 threadably engages the leg member 22 and the second end portion 76 of the retainer member 24 so that the retainer member 24 is securely connected to the leg member 22.

To enhance the stability of the livestock feeder 10 it is desirable to secure the medial portion of each of the retainer members 24, 26, 28 and 30 to the leg members 12, 14, 16, 18 and 20. The connection of the medial portions of the retainer members 24, 26, 28 and 30 to the leg members 12, 14, 16, 18 and 20 is substantially identical. Thus, only the connection of the medial portion 78 of the retainer member 24 to the leg member 12 will be herein after described.

The medial portion 78 of retainer member 24 is provided with a plurality of spatially disposed pilot apertures 94 formed through the sidewall 80, each of which is axially aligned with a pilot aperture 96 (FIG. 3) formed through the opposed sidewall 84.

The medial portion 78 of the retainer member 24 is positioned relative to the leg member 12 so that the axially aligned pilot apertures 94, 96 formed in the medial portion 78 of the retainer member 24 are aligned with the pilot apertures 62, 64 provided in the sidewalls 58, 60 of the leg member 12. The pilot apertures 94, 96 in the medial portion 78 of the retainer member 24 and the pilot apertures 62, 64 in the leg member 12 are sized such that upon positioning a connecter member therethrough, such as a threaded shank portion 100 of a bolt 102, the threaded shank portion 100 threadably engages the leg member 12 and the retainer member 24 so that the medial portion 78 of the retainer member 24 is securely connected to the leg member 12 substantially as shown in FIGS. 1 and 3.

To enhance the durability and portability of the livestock feeder 10, as well as to substantially eliminate the need for maintenance, the leg members 12, 14, 16, 18, 20 and 22 are desirably fabricated from a tubular polymeric material, such as polyethylene pipe. While the length, O.D. and wall thickness of the polyethylene pipe employed in the fabrication of the leg members 12, 14, 16, 18, 20 and 22 can vary widely, desirable results can be obtained when the polyethylene pipe employed in the fabrication of the leg members 12, 14, 16, 18, 20 and 22 has a length of about 3½ feet, an O.D. of from about 3½ inches to about 4½ inches and a wall thickness of at least about ⅜th of an inch.

As shown in FIG. 1, the retainer members 24, 26, 28 and 30 are connected to the leg members 12, 14, 16, 18, 20 such that each of the retainer members 24, 26, 28 and 30 is substantially horizontally disposed about the hay retaining space 32. The distance between each of the retainer members 24, 26, 28 and 30 can vary provided that the distance 33 between the retainer members 24 and 26 is sufficient to permit livestock to have access to the hay 34 in the hay retaining space 32 via the opening formed between the retainer members 24 and 26, while at the same time preventing the livestock from entering into the hay retaining space 32. For example, desirable results have been obtained wherein the spacing between the retainer members 24 and 26 is from about 17 to about 18 inches; the spacing between the retainers members 26 and 28 is from about 6 to about 8 inches; and the spacing between the retainer members 28 and 30 is from about 6 to about 8 inches therebetween. As previously stated, the retainer members 24, 26, 28 and 30 are fabricated of a polymeric material having angular deflection characteristics and memory properties which permit the retainer members 24, 26, 28 and 30 to be angularly deflected when pressures are exerted thereon by livestock and restored to a substantially non-deflected position when such pressures are removed. Desirably, the retainer members 24, 26, 28 and 30 are fabricated from a polymeric material, such as polyethylene pipe, having an O.D. of from about 1⅝ inches to about 3 inches and a wall thickness of from about ³⁄₁₆th of an inch to about ⅜th of an inch.

Figure 6:
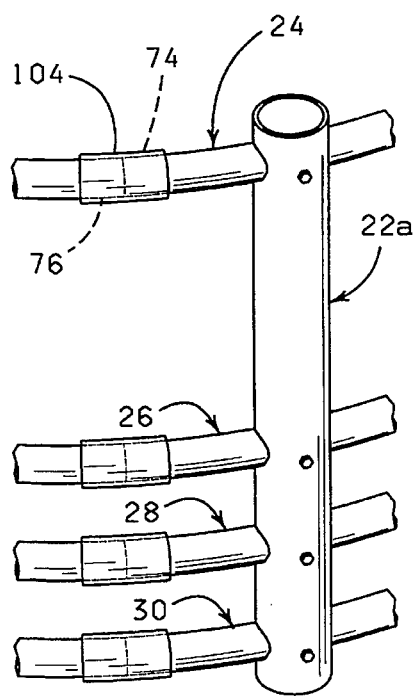
FIG. 6 is a fragmental, perspective view illustrating a second connecting assembly for securing end portions of the retainer members.

Referring now to FIG. 6, a leg member 22a is illustrated having the retainer members 24, 26, 28 and 30 connected thereto. The leg member 22a is substantially identical in construction and function to the leg member 12; and the medial portions of the retainer members 24, 26, 28 and 30 are connected to the leg member 22a in substantially the same manner as the medial portion 78 of the retainer member 24 is connected to the leg member 12. However, when constructing the livestock feeder 10 employing the leg member 22a, the first and second end portions of each of the retainer members, such as the first and second end portions 74, 76 of the retainer member 24 are disposed a distance from the leg member 22a so that the first and second end portions 74, 76 can be connected by a collar member 104. The collar member 104 is a tubular member adapted to slidingly receive the first and second end portions of the retainer members, such as the first and second end portions 74, 76 of the retainer member 24. That is, the first and second end portions of the retainer members are disposed within the collar member 104 in a substantially abutting position and secured within the collar member 104 by any suitable means, such as an adhesive. It should be understood that while the collar member 104 has been illustrated as the connector member for connecting the first and second end portions of the retainer members when utilizing the leg member 22a, other means can be employed for connecting the first and second end portions of the retainer members so as to form a substantially unitary member, such as by heat fusing the first and second end portions of each of the retainer members and the like.

Figure 7:
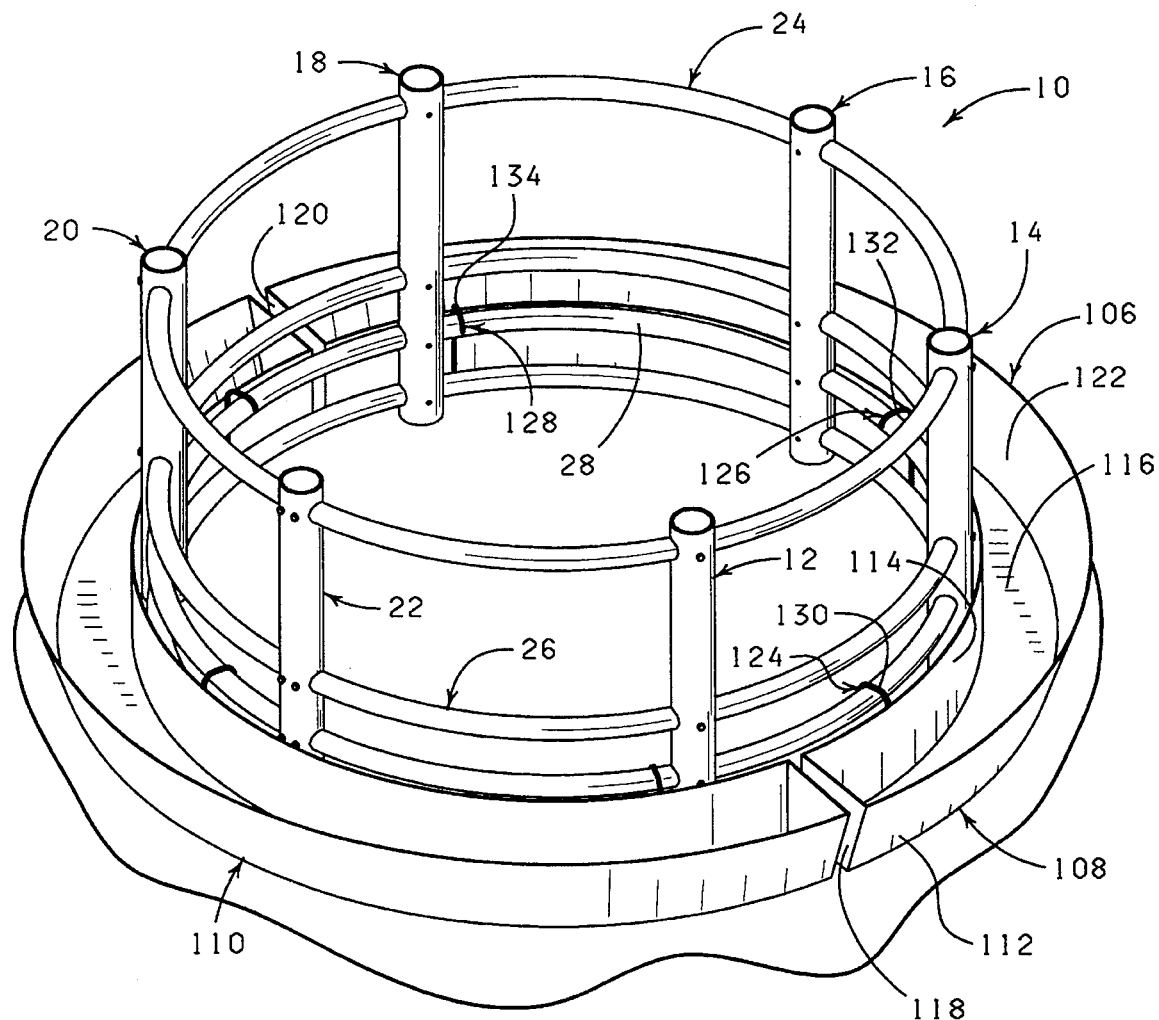
FIG. 7 is a perspective view of the livestock feeder of FIG. 1 having a feed trough disposed about the outer perimeter of the livestock feeder.

To teach livestock, especially cattle, to eat grains and foodstuffs other than hay, it is often desirable to provide a feed trough into which grains and foodstuffs can be dispensed. Accordingly, the livestock feeder 10 of the present invention can further include a feed trough assembly 106 disposed about the lower perimeter of the livestock feeder 10 substantially as shown in FIG. 7.

Figure 8:
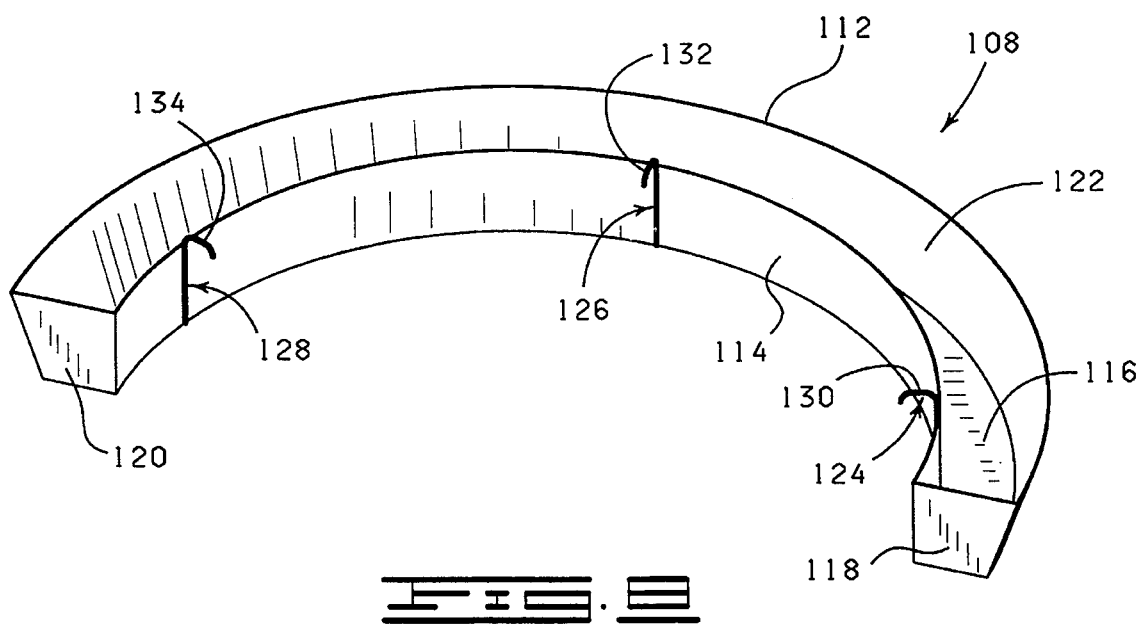
FIG. 8 is a perspective view of a segment of the feed trough of the livestock feeder of FIG. 7.

The feed trough assembly 106 is illustrated as having a first substantially semi-circular shaped feed trough 108 and a second substantially semi-circularly shaped feed trough 110. The first and second substantially semi-circular shaped feed troughs 108 and 110 are substantially identical in construction and function. Thus, only the feed trough 108 will be described in detail with reference to FIG. 8.

The feed trough 108 is provided a front side 112, a spatially disposed rear side 114, a bottom 116, and end panels 118 and 120. The feed trough 108 is desirably fabricated ore a polymeric or metallic material of unitary construction. Thus, the front and rear sidewalls 112, 114 cooperate with the bottom 116 and the end panels 118, 120 to define a feed receiving cavity 122.

A plurality of connector members 124, 126 and 128 are disposed along and connected to the rear side 114 of the feed trough 108 substantially as shown. The connector members 124, 126 and 128 are provided with hook shaped upper end portions 130, 132 and 134, respectively. The hook shaped upper end portions 130, 132 and 134 of the connector members 124, 126 and 128 are disposable over the retainer member 28 and hookingly engage the retainer member 28 so that the feed trough 108 can be connected to the livestock feeder 10 in a stable position.

It should be understood that while the feed trough assembly 106 has been depicted as including the first and second feed troughs 108, 110, only one feed trough, such as feed trough 108, can be employed, or, in the alternative, more than two feed troughs can be employed provided such feed troughs are sized to permit same to be disposed about the lower perimeter of the livestock feeder 10.

Figure 9:
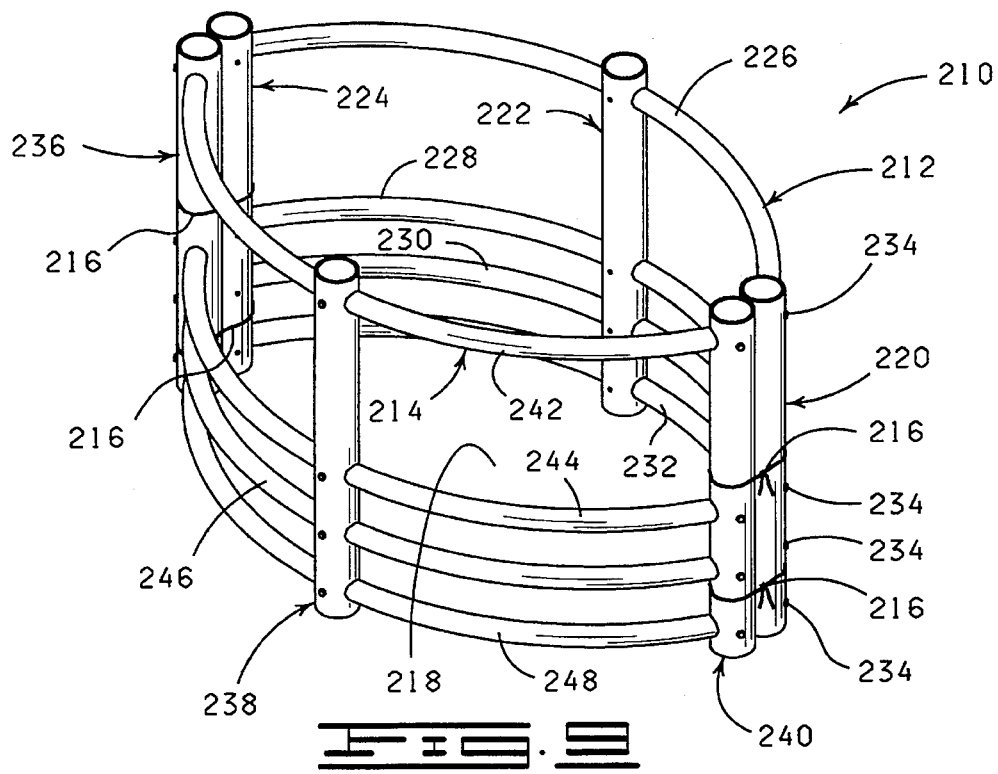
FIG. 9 is a perspective view of another embodiment of a livestock feeder constructed in accordance with the present invention.

Shown in FIG. 9 is a perspective view of a livestock feeder 210 constructed in accordance with the present invention. The livestock feeder 210 includes a first panel section 212, a second panel section 214 and a plurality of connector members 216 for connecting the first and second panel sections 212, 214 so as to define a hay retaining space 218 therebetween. The first panel section 212 of the livestock feeder 210 includes a plurality of spatially disposed leg members 220, 222 and 224; and a plurality of substantially horizontal, spatially disposed retainer members 226, 228, 230 and 232. Similarly, the second panel section 214 of the livestock feeder 210 includes a plurality of spatially disposed leg members 236, 238 and 240; and a plurality of substantially horizontal, spatially disposed retainer members 242, 244, 246 and 248. The leg members 220 and 240 of the first and second panel sections 212, 214 are connected by a plurality of the connector members 216; and the leg members 224 and 236 of the first and second panel sections 212, 214 are likewise connected by a plurality of the connector members 216. Any suitable connecting means can be employed as the connector members 216 for connecting the leg members 216 and 224 to the leg members 236 and 240. For example, the leg member 220 of the first panel section 212 can be connected to the leg member 240 of the second panel section 214 and the leg member 224 of the first panel section 212 can be connected to the leg member 236 of the second panel section 214 with wire, rope or a bolt member threadedly disposed between the adjacently disposed leg members.

The first and second panel sections 212, 214 of the livestock feeder 210 are substantially identical in construction, as are the various leg members and retainer members of such panel sections. Thus, only the first panel section 212 and its components will be described in detail hereinafter.

As previously stated, the first panel section includes a plurality of substantially vertical, spatially disposed leg members 220, 222, 224 and a plurality of substantially horizontal, spatially disposed retainer members 226, 228, 230 and 232. The leg members 220, 222 and 224 of the first panel section 212 are substantially identical in construction to leg member 12 of the livestock feeder 10 hereinbefore described. That is, each of the leg members 220, 222 and 224 has aligned apertures extending through opposed sidewalls which are sized to permit the retainer members 226, 228, 230 and 232 to be disposed therethrough so that the retainer members 226, 228, 230 and 232 can be connected to each of the leg members 220, 222 and 224 with suitable connector members, such as bolts 234. Thus, the retainer members 226, 228, 230 and 232 are connected to the leg members 220, 222 and 224 in substantially the same manner as the retainer members 24, 26, 28 and 30 are connected to the leg member 12 of the livestock feeder 10.

To enhance the durability and portability of the livestock feeder 210, as well as to substantially eliminate the need for maintenance, the leg members 220, 222 and 224 of the first panel section 212 and the leg members 236, 238 and 240 of the second panel section 214 are desirably fabricated from a tubular polymeric material, such as polyethylene pipe. While the length, O.D. and wall thickness of the polyethylene pipe employed in the fabrication of the leg members of the first and second panel sections 212 and 214 can vary widely, desirable results can be obtained when the polyethylene pipe employed in the fabrication of each of the leg members 220, 222, 224, 236, 238 and 240 has a length of about 3½ feet, an O.D. of from about 3½ inches to about 4½ inches and a wall thickness of at least about ⅜th of an inch. As shown in FIG. 9, the retainer members 226, 228, 230 and 232 are connected to the leg members 220, 222 and 224 such that, in an assembled position, each of the retainer members 226, 228, 230 and 232 is substantially horizontally disposed and the hay retaining space 218 is provided between the first and second panel sections 212, 214.

The distance between the retainer members 226, 228, 230 and 232 of the first panel section 212 can vary, provided that the distance between the retainer members 226 and 228 is sufficient to permit livestock to have access to hay in the hay retaining space 218 via the opening formed between the retainer members 226 and 228, while at the same time preventing the livestock from entering into the hay retaining space 218. Similarly, the distance between the retainer members 242, 244, 246 and 248 of the second panel section 214 can vary, provided that the distance between the retainer members 242 and 244 is sufficient to permit livestock to have access to hay in the hay retaining space 218 via the opening formed between the retainer members 242 and 244, while at the same time preventing the livestock from entering into the hay retaining space 218. For example, the spacing between the retainer members 226 and 228 of the first panel section 212 and the spacing between the retainer members 242 and 244 of the second panel section 214 is desirably from about 17 to about 18 inches; the spacing between the retainers members 228 and 230 of the first panel section 212 and the spacing between the retainer members 244 and 246 of the second panel section 214 is desirably from about 6 to about 8 inches; and the spacing between the retainer members 230 and 232 of the first panel section 212 and the spacing between the retainer members 246 and 248 of the second panel section 214 is desirably from about 6 to about 8 inches therebetween. The retainer members 226, 228, 230 and 232 of the first panel section 212, as well as the retainer members 242, 244, 246 and 248 of the second panel section 214, are fabricated of a polymeric material having angular deflection characteristics and memory properties which permit such retainer members to be angularly deflected when pressures are exerted thereon by livestock and restored to a substantially non-deflected position when such pressures are removed. Desirably, the retainer members 226, 228, 230 and 232 of the first panel section 212, and the retainer members 242, 244, 246 and 248 of the second panel section 214 are fabricated from polyethylene pipe having an O.D. of from about 1⅝ inches to about 3 inches and a wall thickness of from about ³⁄₁₆th of an inch to about ⅜th of an inch.

The livestock feeder 210 provides an easily portable unit which can be readily transported from one location in a field or pasture to another. Further, because the livestock feeder 210 is formed of the first and second panel sections 212 and 214, the livestock feeder 210 can readily be disassembled by disconnecting the connector members 216 so that the first and second panel sections 212 and 214 can be easily moved in a pickup truck or on a small flatbed trailer to another location.

Figure 10:
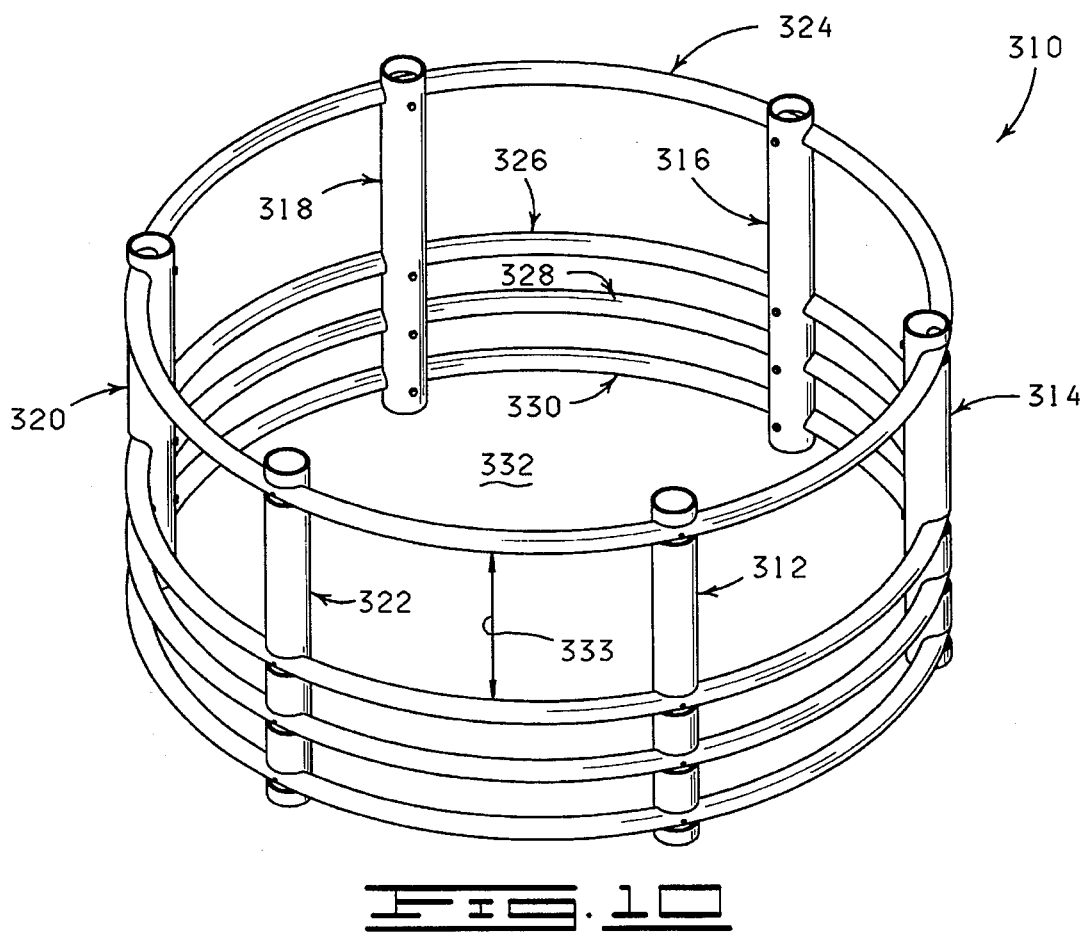
FIG. 10 is a perspective view of another embodiment of a livestock feeder constructed in accordance with the present invention.

Referring now to FIG. 10, a livestock feeder 310 constructed in accordance with the present invention is illustrated. The livestock feeder 310 includes a plurality of spatially disposed leg members 312, 314, 316, 318, 320 and 322 and a plurality of substantially horizontal, spatially disposed retainer members 324, 326, 328 and 330. The retainer members 324, 326, 328 and 330 are connected to the leg members 312, 314, 316, 318, 320 and 322 so as to define a hay retaining space 332.

The retainer members 324, 326, 328 and 330 are fabricated of a polymeric material having angular deflection characteristics and sufficient memory properties so as to permit the retainer members 324, 326, 328 and 330 to be angularly deflected when pressures are exerted thereon by livestock and thereafter restored to a substantially non-deflected position when such pressures are removed. The retainer members 324 and 326 are disposed a selected distance 333 from each other so as to permit access to hay in the hay retaining space 332 by livestock; and the retainer members 324 and 326 cooperate with the retainer members 328 and 330 to prevent livestock from entering into the hay retaining space 332 and trampling the hay therein.

Each of the leg members 312, 314, 316, 318, 320 and 322 are identical in construction and function; and each of the retainer members 324, 326, 328 and 330 are identical in construction. Thus, only the leg member 312 and the connection of the retainer member 324 to the leg member 312 will be described in detail with reference to FIGS. 10–12.

The leg member 312 is a tubular member 334 having a first or outwardly disposed sidewall 336 and an opposed second or inwardly disposed sidewall 338. A plurality of spatially disposed retaining slots 340, 342, 344 and 346 are formed through the first sidewall 336; and a plurality of spatially disposed pilot apertures 348, 350, 352 and 354 (shown in phantom in FIG. 11) are formed through the opposed second sidewall 338 such that one of the pilot apertures is axially aligned with one of the retaining slots, such as the pilot aperture 348 and the retaining slot 340 as shown in FIG. 12. The ring retaining slots 340, 342, 344 and 346 are configured and sized to supportingly receive the retainer members 324, 326 328 and 330 substantially as shown in FIGS. 10 and 12. In one other embodiment, the ring retaining slots 340, 342, 344 and 346 are formed in the leg 312 only to a small amount or distance and the retaining member 324, 326, 328 and 330 are disposed in the ring retaining slots 340, 342, 344 and 346 with a substantial portion of the retaining members 324, 326, 328 and 330 extending a distance outwardly from the legs such as the leg 312.

To enhance retention of the retainer members in the retaining slots of the leg members, such as the retainer member 324 in the retaining slot 340 of the leg member 312, as well as to stabilize the leg members in a substantially upright, vertically disposed position, a plurality of spatially disposed pilot apertures are formed through a sidewall of each of the retainer members and a plurality of spatially disposed axially aligned pilot apertures are formed through an opposed sidewall of each of the retainer members, such as pilot aperture 356 formed through sidewall 358 and axially pilot aperture 360 formed through sidewall 362 of the retainer member 324 substantially as shown in FIG. 12.

The axially aligned pilot apertures formed through the opposed sidewalls of the retainer members, such as the pilot apertures 356, 360 formed through the sidewalls 358, 362 of the retainer member 324, are spatially disposed along the retainer members so that the pilot apertures in the retainer members are alignable with the pilot aperture formed through the second sidewall of the leg members, such as the pilot aperture 348 formed through the sidewall 338 of the leg member 312. The pilot apertures in the leg members and the retainer members are sized such that upon positioning a connector member therethrough, such as a threaded shank portion 364 of a bolt 366, the threaded shank portion 364 threadedly engages the leg member 312 and the retainer member 324 so that the retainer member 324 disposed within the retaining slot 340 of the leg member 312 can be securely connected to the leg member 312.

To enhance the durability and portability of the livestock feeder 310, as well as to substantially eliminate the need for maintenance, the leg members 312, 314, 316, 318, 320 and 322 are desirably fabricated from a tubular polymeric material, such as polyethylene pipe. While the length, O.D. and wall thickness of the polyethylene pipe employed in the fabrication of the leg members of the livestock feeder 310 can vary widely, desirable results can be obtained when the polyethylene pipe employed in the fabrication of each of the leg members 312, 314, 316, 318, 329 and 322 has a length of about 3½ feet, an O.D. of from about 3½ inches to about 4½ inches and a wall thickness of at least about ⅜th of an inch.

The retainer members 324, 326, 328 and 330 are each provided with a substantially circular shaped configuration, substantially as shown in FIG. 10; and the retainer members 324, 326, 328 and 330 are fabricated of a polymeric material having desired angular deflection characteristics and memory properties which permit the retainer members 224, 226, 228 and 230 to be angularly deflected when pressures are exerted thereon by livestock and yet restored to a substantially non-deflected position when such pressures are removed. Desirable results can be obtained wherein the polymeric material employed in the fabrication of the retainer members 224, 226, 228 and 230 is polyethylene pipe having an O.D. of from about 1⅝ inch to about 3 4inches and a wall thickness of from about 3/16 to about ⅜ of an inch.

The retainer members 224, 226, 228 and 230 are provided with a substantially unitary configuration. That is, the retainer members 224, 226, 228 and 230 are fabricated of the afore-described polyethylene pipe and formed into a circular configuration wherein the ends of the polyethylene pipe are secured together by any suitable means, such as heat welding, collars, nipples, adhesives and the like.

The livestock feeder 310 provides a convenient unit for defining a portable hay retaining space which can be readily assembled and disassembled for transportation from one location in a field or pasture to another.

Referring now to FIG. 13, a livestock feeder 410 also constructed in accordance with the present invention is illustrated. The livestock feeder 410 includes a plurality of spatially disposed leg members 412, 414, 416, 418, 420 and 422 and a plurality of substantially horizontal, spatially disposed retainer members 424, 426, 428 and 430. The retainer members 424, 426, 428 and 430 are connected to the leg members 412, 414, 416, 418, 420 and 422 so as to define a hay retaining space 432.

The retainer members 424 and 426 are disposed a selected distance 433 from each other so as to permit access to hay in the hay retaining space 432 by livestock; and the retainer members 424 and 426 cooperate with the retainer members 428 and 430 to prevent livestock from entering into the hay retaining space 432 and trampling the hay therein. The distance between each of the retainer members 424, 426, 428 and 430 can vary provided that the distance 433 between the retainer members 424 and 426 is sufficient to permit livestock to have access to the hay in the hay retaining space 432 via the opening formed between the retainer members 424 and 426, while at the same time preventing the livestock from entering into the hay retaining space 432. For example, desirable results can be obtained wherein the spacing between the retainer members 424 and 426 is from about 17 to about 18 inches; the spacing between the retainers members 426 and 428 is from about 6 to about 8 inches; and the spacing between the retainer members 428 and 430 is from about 6 to about 8 inches therebetween. The retainer member 424, 426, 428 and 430 are each provided with a substantially circular shaped configuration, substantially as shown in FIG. 13; and the retainer members 424, 426, 428 and 430 are fabricated of a polymeric material having desired angular deflection characteristics and memory properties which permit the retainer members 424, 426, 428 and 430 to be angularly deflected when pressures are exerted thereon by livestock and yet restored to a substantially non-deflected position when such pressures are removed. A polymeric material suitable for use in the fabrication of the retainer members 424, 426, 428 and 430 is polyethylene pipe having an O.D. of from about 1⅝ inch to about 3 inches and a wall thickness of from about 3/16 to about ⅜ of an inch.

The ring retainer members 424, 426, 428 and 430 are provided with a substantially unitary configuration. That is, the retainer members 424, 426, 428 and 430 are fabricated of the afore-described polyethylene pipe and formed into a circular configuration wherein the ends of the polyethylene pipe are secured together by any suitable means, such as heat welding, collars, nipples, adhesives and the like.

Each of the leg members 412, 414, 416, 418, 420 and 422 are identical in construction and function; and each of the retainer members 424, 426, 428 and 430 are identical in construction. Thus, only the leg member 412, the retainer member 424 and the connection of the retainer member 424 to the leg member 412 will be described in detail with reference to FIGS. 13–15.

The leg member 412, which can be fabricated of any suitable material having sufficient strength to support the retainer members 424, 426, 428 and 430, is provided with a base portion 434 and a threaded body portion 436. The threaded body portion 436 is characterized as a cylindrically shaped elongated member 438 having a first or lower end 440, a medial portion 442, a second or upper end 444 and a circumference less than the cross sectional diameter of the retainer member 424.

As previously stated, the retainer member 424 is fabricated of a polymeric material and is provided with a substantially circular configuration. The retainer member 424 is further characterized as having an upper side 446 and an opposed lower side 448. Axially aligned apertures extend through the upper and lower sides 446, 448 of the retainer member 412, such as the aperture 450 and the axially aligned apertures are spatially disposed along the retainer member 424 substantially as shown in FIG. 15. The axially aligned apertures formed through the upper and lower sides 446, 448 of the retainer member 424 are sized so that the threaded body portions of the leg members, such as the threaded body portion 436 of the leg member 412, can be disposed therethrough substantially as shown in FIGS. 13 and 14.

The retainer members 424, 426, 428 and 430 are secured in the desired horizontal, spatially disposed position on the leg members 412, 414, 416, 418, 420 and 422 by a plurality of first or lower connector assemblies 452 and a plurality of second or upper connector assemblies 454. The first and second connector assemblies 452, 454 and their use in securing the retainer members to the leg members are substantially identical. Thus only the first and second connector assemblies 452, 454 and their use in securing the retainer member 424 to the leg member 412 will be described in detail with reference to FIG. 14.

The first connector assembly 452 includes a first washer 456 and a first lock nut 458; and the second connector assembly 454 includes a second washer 460 and a second lock nut 462. The first lock nut 458 is threaded onto the threaded body portion 436 of the leg member 412 and thereafter the first washer 456 is slidably positioned on the threaded body portion 436 of the leg member 412 so as to be disposed adjacent the first lock nut 458. Once the first washer 456 and the first lock nut 458 have been disposed on the threaded body portion 436 of the leg member 412 in the desired position, the retainer member 412 is slidably disposed onto the threaded body portion 436 of the leg member 412 via the axially aligned apertures formed through the upper and lower sides 446, 448 of the retainer member 424. Thus, the first washer 456 is disposed adjacent the lower side 448 of the retainer member 412 and the first washer 456 cooperates with the first lock nut 458 to maintain the retainer member 412 in a substantially horizontal position on the leg member 412.

The second connector assembly 454, which includes the second washer 460 and the second lock nut 462, is then positioned on the threaded body portion 436 of the leg member 412 so that the retainer member 424 is secured in a stable position between the first and second connector assemblies 452, 454. Thus, in an assembled position the base portion 434 of the leg member 412 supports the threaded body portion 436 so that an elongated axis of the threaded body portion 436 extends in a substantially vertical direction and the first and second connector assemblies 454, 545 cooperate with the leg member 412 to maintain the retainer member 424 in a substantially horizontal position. Further, the first connector assembly 452 prevents displacement of the retainer member 424 in a downward direction along the threaded body portion 436 of the leg member 412; and the second connector assembly 454 prevents displacement of the retainer member 424 in an upward direction along the threaded body portion 438 of the leg member 412.

Shown in FIG. 16 is a perspective view of a livestock feeder 510 constructed in accordance with the present invention. The livestock feeder 510 includes a plurality of substantially vertical, spatially disposed leg members 512, 514, 516 and 518; and a plurality of substantially horizontal, spatially disposed retainer members 520, 522, 524 and 526. The leg member 512 is connected to a sidewall 528 of a structure, such as a barn 530, by a plurality of first connector members 532; and the leg member 518 is connected to the sidewall 528 of the barn 530 by a plurality of second connector members 534. Thus, the livestock feeder 510 and the sidewall 528 cooperated to define a hay retaining space 536 therebetween.

Any connector member capable of securing the leg members 512 and 518 to the sidewall 528 of the barn 530 in a stable position can be employed as the first and second connector members 532 and 534. For example, the first and second connector members 532, 534 can be a strap material, wire, rope or a bolt member threadedly extending through the leg members 512 and 518 so as to be anchorable in the sidewall 528 of the barn 530.

With the exception of the number of leg members shown for the livestock feeder 510, the livestock feeder 10 is substantially identical in construction to the first and second panel sections 212, 214 of the livestock feeder 210 heretofore describe. That is, each of the leg members 512, 514, 516 and 518 has aligned apertures extending through opposed sidewalls which are sized to permit the retainer members 520, 522, 524 and 526 to be disposed therethrough and connected to each of the leg members 512, 514, 516 and 518 with a suitable connector member, such as a bolt 538. Thus, the retainer members 520, 522, 524 and 526 are connected to the leg members 512, 514, 516 and 518 in substantially the same manner as the retainer members 226, 228, 230 and 232 are connected to the leg members 220, 222 and 224 of the first section 212 of the livestock feeder 210.

To enhance the durability and portability of the livestock feeder 510, as well as to substantially eliminate the need for maintenance, the leg members 512, 514, 516 and 518 are desirably fabricated from a polymeric material, such as polyethylene pipe. While the length, O.D. and wall thickness of the polyethylene pipe employed in the fabrication of the leg members of the livestock feeder 510 can vary widely, desirable results can be obtained when the polyethylene pipe employed in the fabrication of each of the leg members 512, 514, 516 and 518 has a length of about 3½ feet, an O.D. of from about 3½ inches to about 4½ inches and a wall thickness of at least about ⅜th of an inch.

The retainer members 520, 522, 524 and 526 are connected to the leg members 512, 514, 516 and 518 so that, in an assembled position, each of the retainer members 520, 522, 524 and 526 is substantially horizontally disposed. The distance between the retainer members 520, 522, 524 and 526 can vary, provided that the distance between the retainer members 520 and 522 is sufficient to permit livestock to have access to hay in the hay retaining space 536 via the opening formed between the retainer members 520 and 522, while at the same time preventing the livestock from entering into the hay retaining space 536. For example, the spacing between the retainer members 520 and 522 is desirably from about 17 to about 18 inches; the spacing between the retainers members 522 and 524 is desirably from about 6 to about 8 inches; and the spacing between the retainer members 524 and 526 is desirably from about 6 to about 8 inches therebetween.

The retainer members 520, 522, 524 and 526 are fabricated of a polymeric material having angular deflection characteristics and memory properties which permit such retainer members to be angularly deflected when pressures are exerted thereon by livestock and restored to a substantially non-deflected position when such pressures are removed. Desirably, the retainer members 520, 522, 524 and 526 are fabricated from polyethylene pipe having an O.D. of from about 1⅝ inches to about 3 inches and a wall thickness of from about ³⁄₁₆th of an inch to about ⅜th of an inch.

One important feature of the livestock feeders 10, 210, 310, 410 and 510 is the fabrication of their respective retainer members of a polymeric material having angular deflection characteristics and memory properties which permit such retainer members to be angularly deflected when pressures are exerted thereon by livestock and restored to a substantially non-deflected position when such pressures are removed. FIG. 17 depicts the angular deflection in a downward direction of a portion of the retainer member 24 of the livestock feeder 10 when a force is applied thereto by livestock in a downward direction as indicated by the arrow. FIG. 18, on the other hand, depicts the angular deflection in a horizontal direction of a portion of the retainer member 24 of the livestock feeder 10 when a force is applied thereto by livestock in the direction of the arrow.

Another important feature of the livestock feeders 10, 210, 310, 410 and 510 is that such feeders are substantially maintenance free, can readily be disassembled for storage and transportation, and the components of such feeders require less storage space than prior art livestock feeders. These features are illustrated in FIG. 19 wherein a plurality of leg members and retainer members, such as leg members 12 and 312 and retainer members 24 and 424 are positioned on a flatbed trailer 540. The unique design of the livestock feeders 10, 210, 310, 410 and 510 permit the components of such feeders to lay substantially flat on the bed of the flat bed trailer 540.

The livestock feeders of the present invention are especially suitable for feeding hay to cattle. However, when using the livestock feeders of the present invention for feeding hay to horses it may be desirable to employ three retainer members in place of the four retainer members depicted and to shorten the overall height of the livestock feeders. Thus, horses can reach over the uppermost retainer member to access the hay retained in the livestock feeder and thereby prevent the retainer members from rubbing against the manes of the horses. Changes may be made in the construction and the operation of the various components, elements and assemblies described herein without departing from the spirit and scope of the invention as defined in the following claims.

What is claimed:

1. A livestock feeder for retaining hay so that livestock can consume the hay without trampling thereon, comprising:

a plurality of spatially disposed leg members; and a plurality of substantially horizontally, spatially disposed polymeric retainer members detachably connected to the leg members, the polymeric retainer members and the leg members cooperating to define a hay retaining space, the polymeric retainer members permitting access to hay in the hay retaining space by livestock while preventing livestock from trampling hay in the hay retaining space, at least an uppermost disposed polymeric retainer member having angular deflection characteristics and memory which permit such polymeric retainer member to be angularly deflected by pressures exerted thereon and restored to a substantially non-deflected position upon removal of such pressures.

2. The livestock feeder of claim 1 wherein each of the retainer members is characterized as having a first end portion and a second end portion and wherein the leg members are fabricated of tubular polymeric material and each leg member is provided with a plurality of axially aligned apertures spatially disposed along opposing sidewalls of the tubular polymeric material, the axially aligned apertures being sized to receive the polymeric retainer members, and wherein the livestock feeder further comprises first connector means for connecting the first and second end portions of the polymeric retainer members.

3. The livestock feeder of claim 2 wherein the first connector means comprises:

a plurality of collar members for connecting the first and second end portions of each of the polymeric retainer members; and means for securing the collar members to the first and second end portions of the polymeric retainer members.

4. The livestock feeder of claim 2 wherein the first and second end portions of the polymeric retainer members are disposed through opposed, axially aligned apertures in one of the tubular polymeric leg members so that the first and second end portions of each of the polymeric retainer members are disposed in a substantially adjacent facing position, and wherein the first connector means comprises a plurality of bolt members, one of the bolt members connecting the first end portion of the polymeric retainer member to the polymeric leg member and a second bolt member connecting the second end portion of the polymeric retainer member to the polymeric leg member.

5. The livestock feeder of claim 4 wherein the polymeric retainer members are further characterized as having a medial portion extending between the first and second end portions thereof, and wherein the livestock feeder further comprises second connector means for connecting the medial portions of the polymeric retainer members disposed through the axially aligned apertures of the polymeric leg members to such leg members.

6. The livestock feeder of claim 5 wherein each of the retainer members is further characterized as having angular deflection characteristics and a substantially ring-shaped configuration.

7. The livestock feeder of claim 6 wherein the leg members are fabricated of polyethylene pipe having an O.D. of from about 3½ inches to about 4½ inches and a wall thickness of about ⅜th of an inch, and wherein the polymeric retainer members are fabricated of polyethylene pipe having an O.D. of from about 1 ⅝ inches to about 3 inches and a wall thickness of from about 3/16th of an inch to about ⅜th of an inch.

8. The livestock feeder of claim 1 wherein the leg members are fabricated of tubular polymeric material and each leg member is provided with a plurality of ring retaining slots spatially disposed along an outwardly disposed sidewall, each of the ring retaining slots adapted to supportingly receive one of the retainer members.

9. The livestock feeder of claim 8 wherein the livestock feeder further comprises bolt means for connecting the polymeric retainer members to the leg members.

10. The livestock feeder of claim 9 wherein the bolt means threadingly engages the leg member and the polymeric retainer member disposed within the ring retaining slots in the leg members so as to secure the polymeric retainer members to the leg members in a stable position.

11. The livestock feeder of claim 10 wherein the leg members are fabricated of polyethylene pipe having an O.D. of from about 3½ inches to about 4½ inches and a wall thickness of about ⅜th of an inch, and wherein the polymeric retainer members are fabricated of polyethylene pipe having an O.D. of from about 1 ⅝ inches to about 3 inches and a wall thickness of from about 3/16th of an inch to about ⅜th of an inch.

12. The livestock feeder of claim 1 wherein the leg members and the retainer members are disposed in a substantially semi-circular configuration and two distal leg members are connected to a supporting structure so that the polymeric retainer members and the leg members cooperate with the supporting structure to define the hay retaining space.

13. The livestock feeder of claim 1 wherein a first portion of the leg members and a first portion of the retainer members cooperate to form a first section and a second portion of the leg members and a second portion of the retainer members cooperate to form a second section, and wherein the livestock feeder further comprises means for connecting the first and second sections so that the hay retaining space is defined therebetween.

14. The livestock feeder of claim 13 wherein the leg members are fabricated of polyethylene pipe having an O.D. of from about 3½ inches to about 4½ inches and a wall thickness of about ⅜th of an inch, and wherein the polymeric retainer members are fabricated of polyethylene pipe having an O.D. of from about 1 ⅝ inches to about 3 inches and a wall thickness of from about 3/16th of an inch to about ⅜th of an inch.

15. The livestock feeder of claim 1 wherein the leg members comprise a base portion and a threaded body portion and wherein the polymeric retainer members are characterized as having an upper side and an opposed lower side and the polymeric retainer members are provided with axially aligned apertures extending through the upper side and lower side, the threaded body portion of each of the leg members disposable through the axially aligned apertures such that, in an assemble position, the base portion of the leg members supports the body portions thereof so that an elongated axis of each of the threaded body portions extends in a substantially vertical direction and the polymeric retainer members are substantially horizontally and spatially disposed thereon.

16. The livestock feeder of claim 15 further comprising first connector means for securing the polymeric retainer members in a predetermined position on the threaded body portion of the leg members.

17. The livestock feeder of claim 16 wherein the first connector means comprises:

a plurality of first washers and a plurality of first lock nuts, the first lock nuts securing the first washers on the threaded body portion of the leg members so that the first washers are disposed adjacent the lower side of the polymeric retainer members so as to maintain the polymeric retainer members in the substantially horizontally disposed position; and a plurality of second washers and a plurality of second lock nuts, the second lock nuts securing the second washers on the threaded body portion of the leg members so that the second washers are secured on the threaded body portion of the leg members adjacent the upper side of the polymeric retainer members so as to prevent displacement of the polymeric retainer members in an upward direction along the threaded body portion of the leg members.

18. The livestock feeder of claim 17 wherein each of the polymeric retainer members is further characterized as having angular deflection characteristics and a substantially ring-shaped configuration.

19. The livestock feeder of claim 18 wherein the polymeric retainer members are fabricated of polyethylene pipe having an O.D. of from about 1⅝ inches to about 3 inches and a wall thickness of from about ³⁄₁₆th of an inch to about ⅜th of an inch.

20. The livestock feeder of claim 1 wherein the livestock feeder is disposed substantially adjacent a sidewall of a structure and wherein the livestock feeder further comprises connector means for connecting two distal leg members to the sidewall of the structure such that the polymeric retainer members and the leg members cooperate with the sidewall to define the hay retaining space therebetween.

21. The livestock feeder of claim 20 wherein the leg members are fabricated of polyethylene pipe having an O.D. of from about 3½ inches to about 4½ inches and a wall thickness of about ⅜th of an inch, and wherein the polymeric retainer members are fabricated of polyethylene pipe having an O.D. of from about 1⅝ inches to about 3 inches and a wall thickness of from about ³⁄₁₆th of an inch to about ⅜th of an inch.

22. The livestock feeder of claim 1 further comprising trough means connected to one of the retainer members so as to extend outwardly therefrom.

23. A livestock feeder for retaining hay so that livestock can consume the hay without trampling thereon, comprising:

a plurality of spatially disposed leg members; and a plurality of substantially horizontally, spatially disposed retainer members, each of the retainer members fabricated of a polymeric pipe having a first end and a second end secured together to form a unitary, ring-shaped configuration, each of the retainer members detachably connected to the leg members so as to cooperatively define a hay retaining space, the retainer members spaced apart sufficiently to permit access to hay in the hay retaining space by livestock while preventing livestock from trampling hay in the hay retaining space, the retainer members having angular deflection characteristics and memory which permit the retainer members to be angularly deflected by pressures exerted thereon and restored to a substantially non-deflected position upon removal of such pressures.

24. The apparatus of claim 23 wherein the first and second ends of the tubular polymeric pipe is secured together by heat welding.

25. The livestock feeder of claim 23 wherein the leg members are fabricated of polyethylene pipe having an O.D. of from about 3½ inches to about 4½ inches and a wall thickness of about ⅜th of an inch, and wherein the retainer members are fabricated of polyethylene pipe having an O.D. of from about 1⅝ inches to about 3 inches and a wall thickness of from about ³⁄₁₆th of an inch to about ⅜th of an inch.

26. The livestock feeder of claim 25 wherein each leg member is provided with a plurality of ring retaining slots spatially disposed along an outwardly disposed sidewall, each of the ring retaining slots adapted to supportingly receive one of the retainer members.

27. The livestock feeder of claim 26 wherein the livestock feeder further comprises bolt means for connecting the polymeric retainer members to the leg members.

\* \* \* \* \*

UNITED STATES PATENT AND TRADEMARK OFFICE
CERTIFICATE OF CORRECTION

PATENT NO. : 5,522,345

DATED : June 4, 1996

INVENTOR(S) : Joe L. Payne

It is certified that error appears in the above-identified patent and that said Letters Patent is hereby corrected as shown below:

Cover page, ABSTRACT, line 3, please delete "leg member" and substitute therefor --leg members--.

In the drawings, Figure 5, reference numeral "84" associated with the bolt should be changed to --85--.

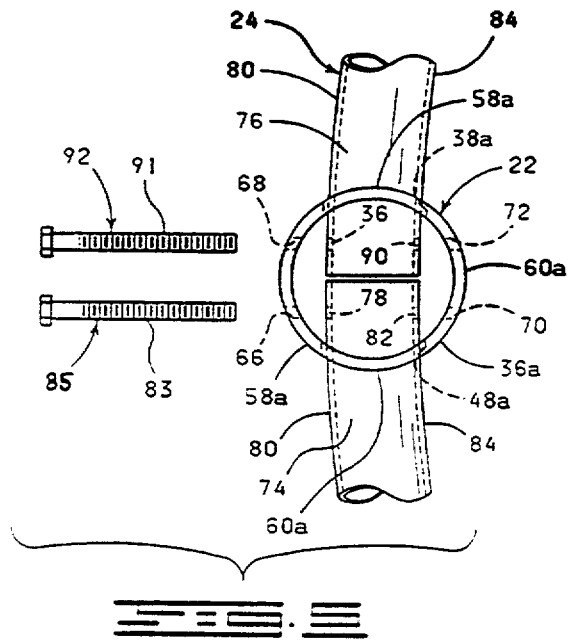

UNITED STATES PATENT AND TRADEMARK OFFICE
CERTIFICATE OF CORRECTION

PATENT NO. : 5,522,345

DATED : June 4, 1996

INVENTOR(S) : Joe L. Payne

It is certified that error appears in the above-identified patent and that said Letters Patent is hereby corrected as shown below:

Column 2, line 36, after "30" please delete "are" and substitute therefor --is--.

Column 3, line 10, please delete "tubular member 36" and substitute therefor --tubular member 36a--.

Column 3, line 47, please delete "bolt 84" and substitute therefor --bolt 85--.

Column 5, line 51, please delete "ore" and substitute therefor --of--.

Column 6, line 27, please delete "leg members 216 and 224" and substitute therefor --leg members 220 and 224--.

Column 7, lines 26-27, please delete the paragraph spacing.

Column 8, line 54, after "axially" please insert --aligned--.

Column 9, line 14, please delete "329" and substitute therefor --320--.

Column 9, lines 23-24, please delete "224, 226, 228 and 230" and substitute therefor --324, 326, 328 and 330--.

Column 9, line 31, please delete "4inches" and substitute therefor --inches--.

UNITED STATES PATENT AND TRADEMARK OFFICE
CERTIFICATE OF CORRECTION

PATENT NO. : 5,522,345

DATED : June 4, 1996

INVENTOR(S) : Joe L. Payne

It is certified that error appears in the above-identified patent and that said Letters Patent is hereby corrected as shown below:

Column 9, line 33, please delete "224, 226, 228 and 230" and substitute therefor --324, 326, 328 and 330--.

Column 9, line 35, please delete "224, 226, 228 and 230" and substitute therefor --324, 326, 328 and 330--.

Column 10, line 48, please delete "retainer member 412" and substitute therefor --retainer member 424--.

Column 11, line 10, please delete "retainer member 412" and substitute therefor --retainer member 424--.

Column 11, line 17, please delete "retainer member 412" and substitute therefor --retainer member 424--.

Column 11, line 28, please delete "454, 545" and substitute therefor --452, 454--.

Column 11, line 36, please delete "threaded body portion 438" and substitute therefor --threaded body portion 436--.

Column 11, line 60, please delete "livestock feeder 10" and substitute therefor --livestock feeder 510--.

Column 13, line 4, please delete "permit" and substitute therefor --permits--.

UNITED STATES PATENT AND TRADEMARK OFFICE
CERTIFICATE OF CORRECTION

PATENT NO. : 5,522,345
DATED : June 4, 1996
INVENTOR(S) : Joe L. Payne

It is certified that error appears in the above-indentified patent and that said Letters Patent is hereby corrected as shown below:

Column 16, line 31, delete "is" and substitute therefor --are--.

Signed and Sealed this

Eighth Day of October, 1996

Attest:

BRUCE LEHMAN

Attesting Officer     Commissioner of Patents and Trademarks